Patented Dec. 28, 1926.

1,612,506

UNITED STATES PATENT OFFICE.

JAMES E. HARRIS, OF SAN FRANCISCO, CALIFORNIA, ASSIGNOR OF ONE-THIRD TO WILLIAM A. CASSIN AND ONE-THIRD TO URSA S. ABBOTT, BOTH OF RICHMOND, CALIFORNIA.

FIRE-RETARDANT PAINT.

No Drawing. Application filed April 5, 1926. Serial No. 99,988.

This invention relates to paints such as used on shingle roofs, exterior surfaces, the trim of a building, etc., and particularly to a paint which is fire retardant and highly resistant to sparks and fire brands when the house is exposed to fire.

The paint is composed of the following ingredients: one gallon crude oil; one pound powdered alum; one pound carbon tetrachloride; one pound sodium silicate; one pound litharge; four pounds of coloring material, such as red metallic or the like. If a hard paint is desired, boiled linseed oil is substituted for the crude oil and a suitable drier may be added.

In preparing the paint employing the above ingredients, I first mix the powdered alum and litharge thoroughly. This when mixed is poured into the crude oil and stirred so as to form a uniform mixture. The sodium silicate is then added and also stirred or mixed in thoroughly. Thereafter, the coloring agent is added and similarly stirred or mixed, and finally the carbon tetra-chloride; the carbon tetra-chloride serving as one of the fire retarding agents, and also serving the function of a thinner, so as to reduce the composition, which permits it to be readily applied to the roof, shingles, or whatever the case may be.

The hard paint is made in a similar manner, the only difference being that one gallon of boiled linseed oil is employed as a substitute for the crude oil, and that a suitable quantity of japan drier or any other drier is added, the hard paint being preferably for the exterior surfaces and trim of a house, while the paint containing the crude oil is particularly adapted to a roof paint, especially when applied to shingles.

The ingredients when thoroughly mixed are applied to the shingles or other surfaces to be protected by brush, spray gun, or in any other suitable manner. When dry, it is found to be highly resistant to sparks, fire brands and so on, and as the mixture has a tendency to soak in or penetrate the shingles or wood surface, it renders the same fire retardant when exposed to heat and fire.

Having thus described my invention, what I claim and desire to secure by Letters Patent is:

1. A fire retardant paint, as herein described, composed of the following ingredients mixed together in the proportions substantially as described, to-wit: crude oil, powdered alum, litharge, carbon tetra-chloride, sodium silicate and a coloring agent.

2. A fire retardant paint as herein described composed of the following ingredients: oil, one gallon; powdered alum, one pound; carbon tetra-chloride, one pound; sodium silicate, one pound; litharge, one-quarter pound; and four pounds of a coloring agent.

3. A fire retardant paint composed of the following ingredients: one gallon crude oil; one pound powdered alum; one pound carbon tetra-chloride; one pound sodium silicate; one-quarter pound litharge; and four pounds of a dry coloring agent.

JAMES E. HARRIS.